(12) United States Patent  (10) Patent No.: US 8,285,910 B2
Wang  (45) Date of Patent: Oct. 9, 2012

(54) METHOD AND SYSTEM FOR TAKING OVER DEVICES

(75) Inventor: Xueyou Wang, Shenzhen (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 0 days.

(21) Appl. No.: 13/368,106

(22) Filed: Feb. 7, 2012

(65) Prior Publication Data

US 2012/0137042 A1  May 31, 2012

Related U.S. Application Data

(63) Continuation of application No. PCT/CN2010/075663, filed on Aug. 3, 2010.

(30) Foreign Application Priority Data

Aug. 7, 2009  (CN) .......................... 2009 1 0161060

(51) Int. Cl.
  *G06F 13/20*  (2006.01)
(52) U.S. Cl. ........... 710/313; 710/305; 710/316; 714/56
(58) Field of Classification Search .......... 710/305–306, 710/313, 316–317; 714/56
  See application file for complete search history.

(56) References Cited

U.S. PATENT DOCUMENTS 7,877,521 B2 * 1/2011 Suzuki et al. .................. 710/10
2010/0088456 A1 * 4/2010 Chu et al. ...................... 710/316

FOREIGN PATENT DOCUMENTS

| CN | 1373427 A | 10/2002 |
|---|---|---|
| CN | 101237315 A | 8/2008 |
| CN | 101631083 A | 1/2010 |
| TW | 200513844 A | 4/2005 |
| WO | WO 9959066 A1 | 11/1999 |
| WO | WO 2011015130 A1 | 2/2011 |

OTHER PUBLICATIONS

International Search Report in corresponding International Patent Application No. PCT/CN2010/075663 (Nov. 18, 2010).
Written Opinion of the International Searching Authority in corresponding International Patent Application No. PCT/CN2010/075663 (Nov. 18, 2010).

* cited by examiner

*Primary Examiner* — Brian Misiura
*Assistant Examiner* — Kim Huynh
(74) *Attorney, Agent, or Firm* — Leydig, Voit & Mayer, Ltd.

(57) ABSTRACT

A method and system for taking over devices are provided. In a solution, a first control board first performs topology discovery on a Peripheral Component Interconnect Express (PCIE) bus, and reserves resources for a Switch (SW) where a NON-Transparent (NT) bridge is located and devices connected to down ports of the SW according to a set resource reservation policy when the topology discovery proceeds to the NT bridge, where the SW and the devices are currently controlled by a second control board. After the SW and the devices are taken over from the second control board, the resource reserved in advance may be allocated to the SW and the devices, so that the devices that are taken over operate normally under control of the first control board. Dual control is implemented through direct taking over devices, and a response speed for processing a device request is improved.

15 Claims, 8 Drawing Sheets

METHOD AND SYSTEM FOR TAKING OVER DEVICES

CROSS-REFERENCE TO RELATED APPLICATIONS

This application is a continuation of International Application No. PCT/CN2010/075663, filed on Aug. 3, 2010, which claims priority to Chinese Patent Application No. 200910161060.0, filed on Aug. 7, 2009, both of which are hereby incorporated by reference in their entireties.

FIELD OF THE INVENTION

The present invention relates to the field of electronic technologies, and in particular to a method and system for taking over devices.

BACKGROUND OF THE INVENTION

At present, with the development of bus technology and dual control technology, in the field of Peripheral Component Interconnect Express (PCIE) bus technology, many Switches (SWs) have NON-Transparent (NT) bridges. In the prior art, an NT bridge is also commonly used to implement dual control over a device.

The NT bridge is an NT PCIE connection bridge. An NT bridge of an SW may prevent a host from enumerating connection to devices which under the NT bridge, allow opening windows for data exchange at the same time. The devices which under the NT bridge and a memory space of the devices are isolated by the NT bridge.

In a dual control system in the prior art, the PCIE NT bridge mirroring technology is used to implement the dual control over a device. For example, a device is controlled by a control board A. When the control board A has a fault, another control board B, which connected to the control board A through an NT bridge, may process a request of the device indirectly by adopting the mirroring technology. The control boards A and B implement the dual control over the device accordingly, and the anti-fault capability of the system is improved.

During the implementation of the present invention, the inventor finds that the response speed of the devices is usually slow when the mirroring technology is adopted to process the request of the devices indirectly.

SUMMARY OF THE INVENTION

Embodiments of the present invention provide a method and system for taking over devices, which implement dual control over devices through direct taking over a faulty device. And the response speed of the devices can be improved though the method and system.

In order to solve the above technical problem, embodiments of the present invention provide the following technical solutions.

A method for taking over devices includes:

performing, by a first control board, topology discovery on a PCIE bus;

when the topology discovery proceeds to an NT bridge, reserving resources for an SW where the NT bridge is located and devices connected to down ports of the SW according to a set resource reservation policy, where the SW where the NT bridge is located and the devices are currently controlled by a second control board; and when the second control board has a fault, taking over the SW and the devices from the second control board, and allocating the reserved resources to the SW and the devices, so that the SW and the devices operate under control of the first control board.

An apparatus for taking over devices includes: a topology discovery module, a resource reservation module and a takeover module.

The topology discovery module is configured to perform topology discovery on a PCIE bus;

The resource reservation module is configured to reserve resources for an SW where an NT bridge is located and devices connected to down ports of the SW according to a set resource reservation policy when the topology discovery of the topology discovery module proceeds to the NT bridge, where the SW where the NT bridge is located and the devices are currently controlled by a second control board;

The takeover module is configured to take over the SW and the devices connected to the down ports of the SW from the second control board when the second control board has a fault, and allocate the resources reserved by the resource reservation module to the SW and the devices, so that the SW and the devices operate under control of the apparatus for taking over devices.

A system for dual controlling includes: a first control board and a second control board.

The first control board is configured to perform topology discovery on a PCIE bus; reserve resources for an SW where an NT bridge is located and devices connected to down ports of the SW according to a set resource reservation policy when the topology discovery proceeds to the NT bridge, where the SW with the NT bridge and the devices are currently controlled by the second control board; and take over the SW and the devices from the second control board when the second control board has a fault, and allocate the reserved resources to the SW and the devices, so that the SW and the devices operate under control of the first control board.

BRIEF DESCRIPTION OF THE DRAWINGS

To illustrate the technical solutions according to the embodiments of the present invention and in the prior art more clearly, the accompanying drawings required for describing the embodiments and the prior art are introduced below briefly. Apparently, the accompanying drawings in the following descriptions merely show some of the embodiments of the present invention, and persons of ordinary skill in the art can obtain other drawings according to the accompanying drawings without creative efforts.

FIG. 3-*a* is a schematic architecture diagram of dual control of resource reservation according to Embodiment 2 of the present invention;

FIG. 3-*b* is a schematic architecture diagram of dual control of allocation of reserved resources according to Embodiment 2 of the present invention;

FIG. 5-*a* is a schematic architecture diagram of dual control without resource reservation according to Embodiment 3 of the present invention;

FIG. 5-*b* is a schematic architecture diagram of dual control of resource reservation according to Embodiment 3 of the present invention;

FIG. 5-*c* is a schematic architecture diagram of dual control of allocation of reserved resources according to Embodiment 3 of the present invention;

DETAILED DESCRIPTION OF THE EMBODIMENTS

Embodiments of the present invention provide a method and system for taking over devices, which implement dual control over devices through direct taking over the devices, and the response speed of the devices can improved.

The technical solutions of the embodiments of the present invention will be clearly and fully described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

First, it should be noted that with the development of SWs, a Failover (FV) function may be set in an SW with an NT bridge. The so-called FV refers to that an SW with an NT bridge has a port type conversion function, that is, under control of a control board, the NT bridge of the SW may be converted to an up port, and an up port of the SW may also be converted to an NT bridge, and the rest may be deduced by analogy.

The embodiments of the present invention mainly use the FV function of the SW with the NT bridge to take over devices directly. The present invention is described in detail below through specific embodiments.

Embodiment 1

Figure 1:
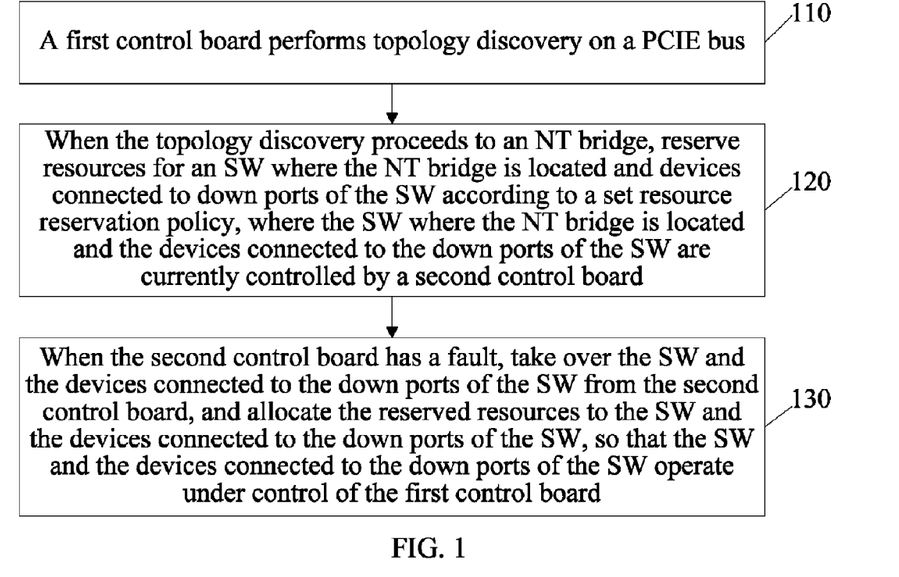
FIG. 1 is a flow chart of a method for taking over devices according to Embodiment 1 of the present invention.

A flow chart of a method for taking over devices is shown in FIG. 1, and the method includes the following steps.

Step 110: A first control board performs topology discovery on PCIE bus.

The so-called topology discovery refers to discovering different bus and devices which connected to the bus by scanning the PCIE bus of a system.

Step 120: When the topology discovery proceeds to an NT bridge, reserve resources for an SW where the NT bridge is located and devices connected to down ports of the SW according to a set resource reservation policy, where the SW where the NT bridge is located and the devices connected to the down ports of the SW are currently controlled by a second control board.

In an application scenario, the first control board may perform the topology discovery on all tributaries of the PCIE bus according to a depth traverse manner when an Operating System (OS) is started.

In another application scenario, the first control board may perform the topology discovery on a tributary of the PCIE bus where the NT bridge is located according to the depth traverse manner during a stable operation process of the OS.

In the above two application scenarios, when the topology discovery proceeds to the NT bridge, bus resources and/or address space resources may be reserved for the SW where the NT bridge is located and the devices connected to the down ports of the SW according to the set resource reservation policy, wherein the SW and the devices are currently controlled by the second control board.

In an application scenario, the above set resource reservation policy may include: the preset number of resources reserved for the SW where the NT bridge is located and the devices connected to the down ports of the SW in different scenarios. For example, if a down port of an SW with an NT bridge is usually connected to a network card device, the number of reserved address space resources may be set according to an address space resource requirement of the network card device, and adequate address space resources are reserved for the network card device as far as possible. The rest may be deduced by analogy.

Step 130: When the second control board has a fault, take over the SW and the devices connected to the down ports of the SW from the second control board, and allocate the reserved resources to the SW and the devices connected to the down ports of the SW, so that the SW and the devices operate under control of the first control board.

In an application scenario, when the second control board which is currently controlling the SW has a fault, the first control board may convert the NT bridge of the SW to an up port, namely the first control board directly take over the SW and the devices connected to the down ports of the SW through using an Failover (FV) function of the SW.

When taking over the devices, the first control board may also allocate the reserved resources to the SW and the devices connected to the down ports of the SW according to bus resources and/or address space resources required by the SW and the devices, so that the SW and the devices previously controlled by the second control board keep on normal operating under control of the first control board. For example, if the first control board reserves three bus resources and 6M address space resources in advance, the SW taken over from the second control board currently includes one up port and two down ports, and two endpoint devices which respectively requiring 2M address space resources are connected to the two down ports, then the first control board may respectively allocate the three bus resources to the one up port and the two down ports of the SW, and uniformly or non-uniformly allocate the 6M address space resources to the two endpoint devices.

The devices connected to the down ports of the SW may include endpoint devices and/or bridge devices.

It can be understood that, the technical solution of this embodiment may be implemented by the first control board or a part of functional modules of the first control board.

It can be understood that, in this embodiment, it is taken as an example for illustration that the first control board reserves resources for the SW where the NT bridge is located and the devices connected to the down ports of the SW, and the SW and the devices are controlled by the second control board; when the second control board has a fault, the first control board takes over the SW and the devices connected to the down ports of the SW from the second control board, and allocates the reserved resources to the SW and the devices connected to the down ports of the SW. Definitely, the second control board may also reserve resources in advance for the SW where the NT bridge is located and the devices connected to the down ports of the SW, and the SW and the devices are controlled by the first control board; when the first control board has a fault, the second control board takes over the SW and the devices from the first control board, and allocates the reserved resources to the SW and the devices, thereby the second control board take over devices from the first control board, and the first control board and the second control board implement dual control over the devices.

It can be seen from the above technical solution that, in this embodiment, the first control board reserves resources for the SW with the NT bridge and the devices connected to the down ports of the SW in advance, wherein the SW and the devices are controlled by the second control board, and allocates the resources reserved in advance to the SW and the devices after taking over the SW and the devices from the second control board. In this way, the devices that are taken over have relatively adequate operable resources, and operate normally under control of the first control board. The dual control is implemented through direct taking over devices, and the response speed of request processing is improved.

Embodiment 2

For the convenience of understanding, in this embodiment, it is taken as an example for specific illustration that when a system is started, a control board A reserves resources for an SW with an NT bridge and devices connected to down ports of the SW, wherein the SW and the devices are currently controlled by a control board B, and allocates the reserved resources to the devices after taking over the SW and the devices from the control board B.

Figure 2:
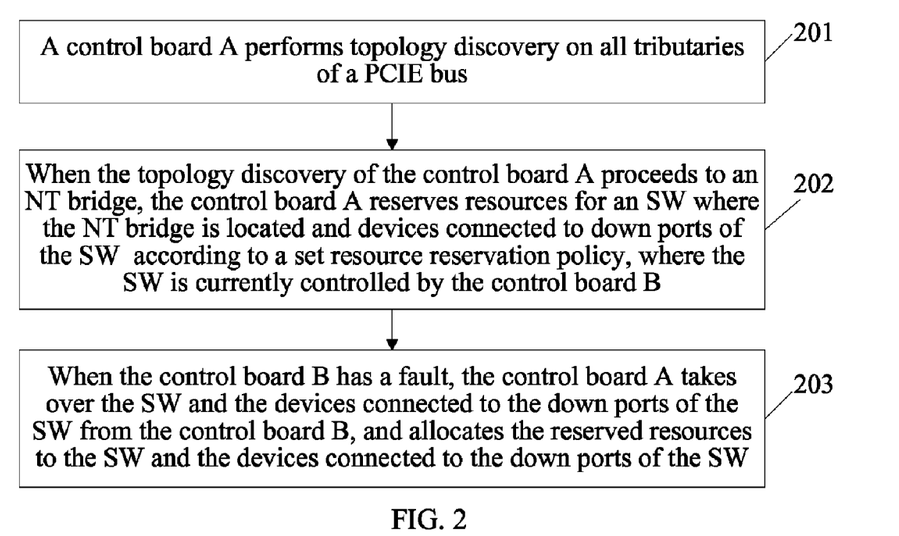
FIG. 2 is a flow chart of a method for taking over devices according to Embodiment 2 of the present invention.

A flow chart of a method for taking over devices is shown in FIG. 2, and the method includes the following steps.

Step 201: A control board A performs topology discovery on all tributaries of a PCIE bus.

Step 202: When the topology discovery of the control board A proceeds to an NT bridge, the control board A reserves resources for an SW where the NT bridge is located and devices connected to the down ports of the SW according to a set resource reservation policy, where the SW is currently controlled by the control board B.

In an application scenario, when an OS of the control board A is started, a system kernel of the control board A may perform the topology discovery on all tributaries of the PCIE bus in sequence according to a depth traverse manner.

Specifically, according to a type identity (ID) carried by each device under the PCIE bus, the control board A may judge a type and a resource requirement of the device, thereby allocating bus resources and/or address space resources to different types of devices according to the resource requirements of the devices.

The devices under the PCIE bus may include endpoint devices (for example, functional devices such as a network card and a display adapter) and bridge devices (for example, SWs).

The set resource reservation policy may include the preset number of resources reserved for the SW where the NT bridge is located and the devices connected to the down ports of the SW in different scenarios. Specifically, the number of the resources to be reserved may be set according to different application scenarios.

For example, when the topology discovery of the control board A proceeds to an endpoint device, the control board A may allocate address space resources to the endpoint device according to a resource requirement of the endpoint device; when the topology discovery proceeds to an SW without an NT bridge, the control board A may allocate one bus resource to the SW without an NT bridge first, and then continue the topology discovery on devices under the bus; when the topology discovery proceeds to an NT bridge, the control board A reserves bus resources (or reserves bus resources and address space resources) for an SW where the NT bridge is located, and reserves bus resources and/or address space resources for devices connected to down ports of the SW according to the set resource reservation policy. The rest may be deduced by analogy until the topology discovery on all tributaries of the PCIE bus is finished.

It should be noted that, when the topology discovery on the PCIE bus is performed, the topology discovery of the control board A may proceed to one or more NT bridges, and SW(s) where the one or more NT bridges are located and devices connected to down ports of the SW(s) may be actually controlled by another one or more control boards currently. The control board A may reserve resources for each SW where the NT bridge is located and the devices connected to the down ports of the SW. In this embodiment, it is taken as an example for specific illustration that the topology discovery of the control board A only proceeds to one NT bridge, and an SW where the NT bridge is located is currently controlled by the control board B.

Step 203: When the control board B has a fault, the control board A takes over the SW and the devices connected to the down ports of the SW from the control board B, and allocates the reserved resources to the SW and the devices connected to the down ports of the SW.

In an application scenario, when the control board B has a fault, the control board A may convert an up port of the SW connected to the control board B to an NT bridge, and convert an NT bridge of the SW connected to the control board A to an up port, thereby taking over the SW and the devices connected to the down ports of the SW from the control board B. At the same time, the control board A may perform the topology discovery on the SW and the devices connected to the down ports of the SW according to the depth traverse manner, allocate a part of or all bus resources reserved in advance to the up port and down ports of the SW, and allocate a part of or all bus resources and/or address space resources to the devices connected to the down ports of the SW according to a bus resource requirement of the SW and a bus resource requirement and/or an address space resource requirement of the devices, so that the SW and the devices connected to the down ports of the SW may continue normal operation under control of the control board A.

It can be seen that the SW and the devices connected to the down ports of the SW taken over by the control board A are allocated adequate operable resources, therefore being capable of operating normally under control of the control board A. Dual control over the SW and the devices connected to the down ports of the SW is implemented successfully by the control board B and the control board A.

It can be understood that, if the topology discovery of the control board A proceeds to multiple NT bridges, and SWs where the multiple NT bridges are located are currently controlled by another one or more control boards, for an SW where each NT bridge is located and the devices connected to the down ports of the SW, the control board A may adopt the above manner to take over devices and allocate the reserved resources, and details are not described herein again.

It can be understood that, in this embodiment, it is taken as an example for illustration that the control board A reserves resources in advance for the SW where the NT bridge is located and the devices connected to the down ports of the SW, and the SW is controlled by the control board B; when the control board B has a fault, the control board A takes over the SW and the devices connected to the down ports of the SW from the control board B, and allocates the reserved resources to the SW and the devices connected to the down ports of the SW. Definitely, the control board B may also reserve resources in advance for the SW where the NT bridge is located and the devices connected to the down ports of the SW, and the SW is controlled by the control board A; when the control board A has a fault, the control board B takes over the SW and the devices connected to the down ports of the SW from the control board A, and allocates the reserved resources to the SW and the devices. A process for the control board B to implement the takeover may be the same as an implementation process of the control board A, and details are not described herein again.

For better understanding of the above technical solution of this embodiment, the technical solution of this embodiment is further described in detail below through a specific example.

Figure 3A:
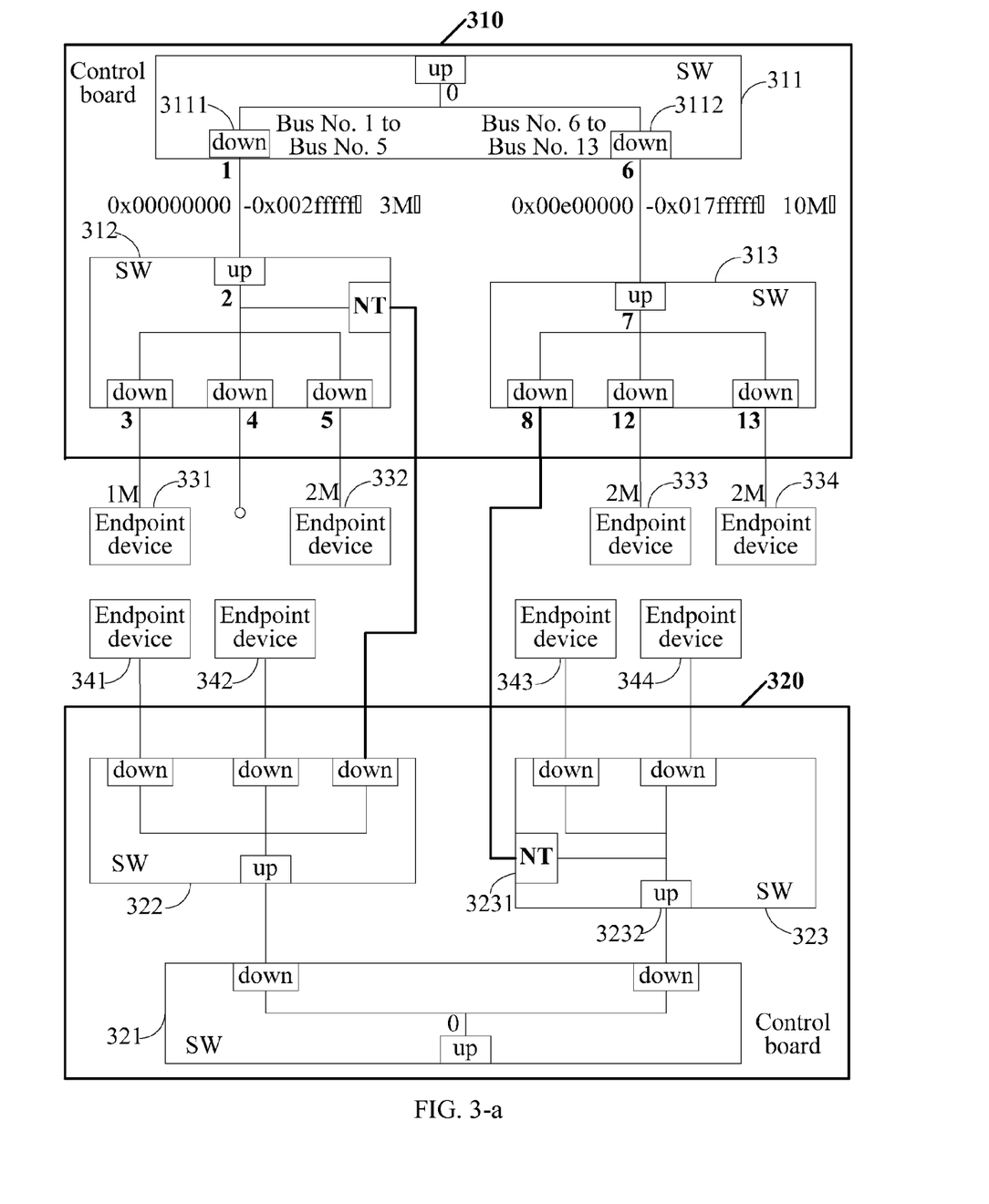
Figure 3B:
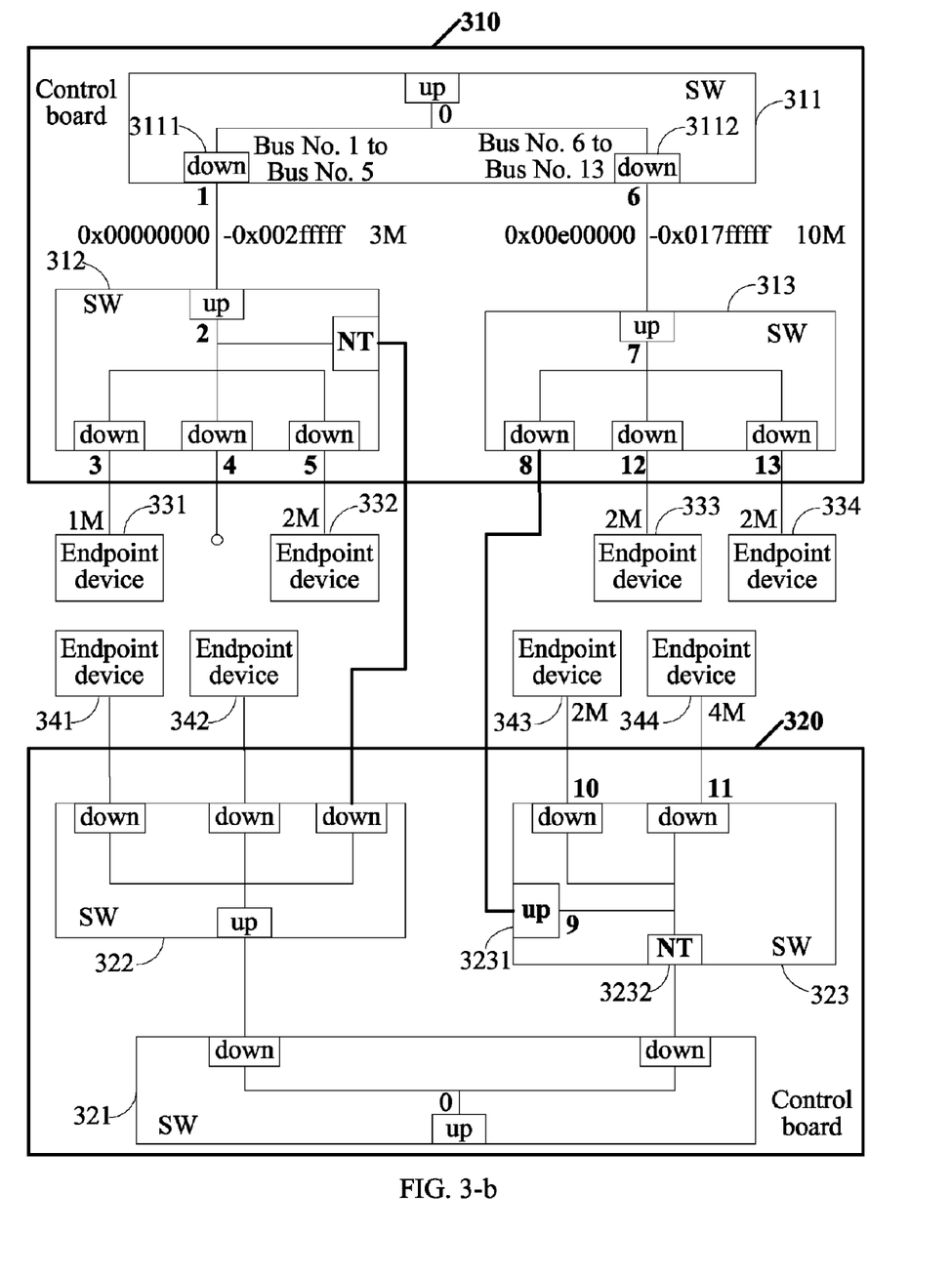

Referring to FIG. 3-a and FIG. 3-b, it is taken as an example that a control board 310 is the above control board A, and a control board 320 is the above control board B. As shown in FIG. 3-a and FIG. 3-b, the control board 310 controls an SW 311, an SW 312 and an SW 313. The control board 320 controls an SW 321, an SW 322 and an SW 323.

A down port 3111 of the SW 311 is connected to the SW 312; a down port 3112 of the SW 311 is connected to the SW 313. An NT bridge port of the SW 312 is connected to a down port of the SW 322; a port 3231 of the SW 323 is connected to a down port of the SW 313.

When an OS of the control board 310 is started, a system kernel of the control board 310 performs topology discovery on all tributaries under PCIE bus according to a depth traverse manner, and allocates or reserves address space resources and/or bus resources for devices that the topology discovery proceeds to.

As shown in FIG. 3-a, the port 3231 of the SW 323 is an NT bridge currently, and a port 3232 is an up port currently. The control board 310 allocates the No. 0 bus resource to the up port of the SW 311, allocates the No. 1 bus resource to the down port 3111, and allocates the No. 6 bus resource to the down port 3112; allocates the No. 2 bus resource to the up port of the SW 312, and allocates No. 3, No. 4 and No, 5 bus resources to down ports of the SW 312; allocates 1M (0x00000000~0x000fffff) address space resources to an endpoint device 331, and allocates 2M (0x00100000~0x002fffff) address space resources to an endpoint device 332; allocates No. 7, No. 8, No. 12 and No. 13 bus resources to the up port and three down ports of the SW 313; reserves No. 9, No. 10 and No. 11 bus resources for the SW 323, and reserves 6M (0x00e00000~0x013fffff) address space resources for endpoint devices 343 and 344; allocates 2M (0x01400000~0x015fffff) address space resources to an endpoint device 333, and allocates 2M (0x01600000~0x017fffff) address space resources to an endpoint device 334.

After the topology discovery is finished, bus numbers and address resources of the PCIE are increased in sequence. A valid bus number range allowed by the port 3111 of the SW 311 is No. 1 to No. 5, and an address space range allowed by the port 3111 is 0x00000000~0x002fffff (3M); a valid bus number range allowed by the port 3112 is No. 6 to No. 13, and an address space range allowed by the port 3112 is 0x00e00000~0x017fffff (10M).

As shown in FIG. 3-b, when the control board 320 has a fault or due to other causes, the control board 310 takes over the SW 323, the endpoint device 343 and the endpoint device 344 from the control board 320, namely converting a port 3232 of the SW 323 to an NT bridge and converting a port 3231 of the SW 323 to an up port. At the same time, the control board 310 may perform the topology discovery on devices under the No. 8 bus according to the depth traverse manner, allocate the reserved No. 9, No. 10 and No. 11 bus resources to the one up port and the two down ports of the SW 323 and allocate the reserved 6M (0x00e00000~0x013fffff) address space resources to the endpoint devices 343 and 344, for example, allocating 2M (0x00e00000~0x00ffffff) to the endpoint device 343 and allocating 4M (0x01000000~0x013fffff) to the endpoint device 344, according to resource requirements of the SW 323, the endpoint device 343 and the endpoint device 344.

At this time, as far as the control board 310 is concerned, the SW 323, the endpoint device 343 and the endpoint device 344 have relatively adequate operable resources, so that the SW 323, the endpoint device 343 and the endpoint device 344 can continue normal operation under control of the control board 310. Therefore, the control board 310 and the control board 320 implement the dual control over the SW 323, the endpoint device 343 and the endpoint device 344 by utilizing the NT bridge, thereby improving an anti-fault capability of the system.

It can be understood that, the control board 320 may also perform the topology discovery on the PCIE bus according to the above manner, and reserve resources for the SW 312 where the NT bridge is located, and the endpoint device 331 and endpoint device 332 connected to the down ports of the SW of the control board 310. When the control board 310 has a fault, the control board 320 may also take over the SW 312, the endpoint device 331 and the endpoint device 332 according to the above manner, and implement the dual control by directly taking over the SW 312, the endpoint device 331 and the endpoint device 332.

It can be seen from the above technical solution that, in this embodiment, when the OS is started, the control board A reserves resources for the SW with the NT bridge and the devices connected to the down ports of the SW, wherein the SW is currently controlled by the control board B, and allocates the resources reserved in advance to the SW and the devices connected to the down ports of the SW after taking over the SW and the devices connected to the down ports of the SW from the control board B. In this way, the devices which are taken over have relatively adequate operable resources, and can operate normally under control of the control board A. The double control is implemented through direct taking over devices, and a response speed for processing a device request is improved.

Embodiment 3

For the convenience of understanding, in this embodiment, it is taken as an example for specific illustration that a control board A reserves resources for an SW with an NT bridge and devices connected to down ports of the SW at any moment after a system operates stably, wherein the SW is currently controlled by a control board B, and allocates the reserved resources to the devices after taking over the SW and the devices from the control board B.

Figure 4:
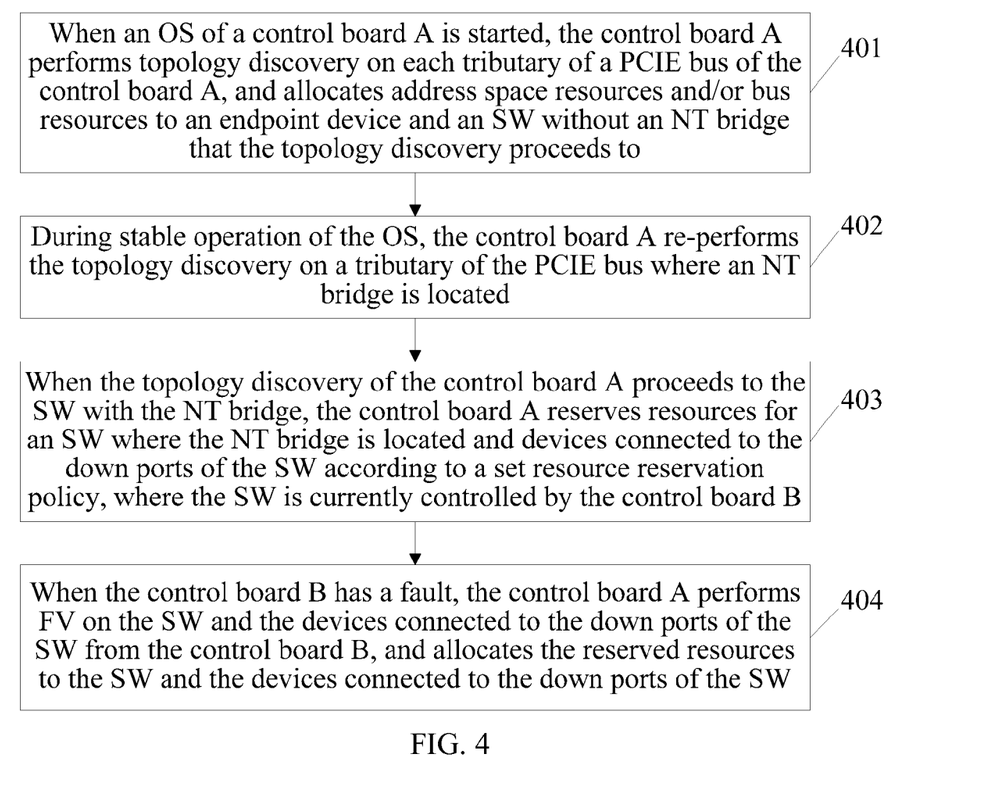
FIG. 4 is a flow chart of a method for taking over devices according to Embodiment 3 of the present invention.

A flow chart of a method for taking over devices is shown in FIG. 4, and the method includes the following steps.

Step 401: When an OS of a control board A is started, the control board A performs topology discovery on each tributary of a PCIE bus of the control board A, and allocates address space resources and/or bus resources to an endpoint device and an SW without an NT bridge that the topology discovery proceeds to.

In an application scenario, when the OS of the control board A is started, a system kernel of the control board A may perform the topology discovery on all tributaries of the PCIE bus in sequence according to a depth traverse manner.

Specifically, according to a type ID carried by each device under the PCIE bus, the control board A may judge a type and a resource requirement of the device, thereby allocating bus resources and/or address space resources to different types of devices according to the resource requirements of the devices.

Due to an attribute feature of the NT bridge, when the topology discovery is performed on the PCIE bus, if the topology discovery of the control board A proceeds to an NT bridge, the control board A cannot perform further topology discovery on an SW where the NT bridge is located and devices connected to down ports of the SW, and thereby directly skipping the topology discovery on the SW where the NT bridge is located and the devices connected to the down ports of the SW.

For example, when the topology discovery of the control board A proceeds to an endpoint device, the control board A may allocate address space resources to the endpoint device according to a resource requirement of the endpoint device. When the topology discovery proceeds to an SW without an NT bridge, the control board A may allocate a bus resource to the SW without an NT bridge, and then continue the topology discovery on devices under the bus. When the topology discovery proceeds to an NT bridge, the control board A may record a location of the NT bridge and stop the topology discovery on the SW where the NT bridge is located and devices connected under the SW, and temporarily does not allocate resources to the SW where the NT bridge is located and the devices connected under the SW. The rest may be deduced by analogy until the topology discovery on all tributaries of the PCIE bus is finished.

Step 402: During stable operation of the OS, the control board A re-performs the topology discovery on a tributary of the PCIE bus where an NT bridge is located.

In an application scenario, the control board A may re-perform the topology discovery on the tributary of the PCIE bus where the NT bridge is located according to the depth traverse manner at any moment after the OS operates stably, and reserve or re-allocate resources for the tributary.

Step 403: When the topology discovery of the control board A proceeds to an SW with the NT bridge, the control board A reserves resources for the SW where the NT bridge is located and devices connected to the down ports of the SW according to a set resource reservation policy, wherein the SW is currently controlled by the control board B.

Specifically, during a process that the control board A re-performs the topology discovery on the tributary where the NT bridge is located, when the topology discovery proceeds to an endpoint device, the control board A may re-allocate address space resources to the endpoint device according to a resource requirement of the endpoint device; when the topology discovery proceeds to an SW without an NT bridge, the control board A may re-allocate a bus resource to the SW without an NT bridge, and then continue the topology discovery on devices under the bus; when the topology discovery proceeds to an NT bridge, the control board A may reserve bus resources and/or address space resources for an SW where the NT bridge is located and devices connected to down ports of the SW according to the set resource reservation policy. The rest may be deduced by analogy until the topology discovery on the tributary where the NT bridge is located is finished.

The set resource reservation policy may include the preset number of resources reserved for the SW where the NT bridge is located and the devices connected to the down ports of the SW in different scenarios. Specifically, the number of the resources to be reserved may be set according to different application scenarios.

It can be understood that, when the system is started, the topology discovery of the control board A may proceed to one or more NT bridges, and SW(s) where the one or more NT bridges are located and devices connected to the down ports of the SW(s) may be actually controlled by another one or more control boards currently. At any moment after the system operates stably, the control board A may re-perform topology discovery on a tributary of the PCIE bus where each NT bridge is located, reserve resources for an SW where each NT bridge is located and the devices connected to the down ports of the SW, and re-allocate resources to other devices that the topology discovery proceeds to. In this embodiment, it is taken as an example for specific illustration that the topology discovery of the control board A only proceeds to one NT bridge when the system is started, and an SW where the NT bridge is located is currently controlled by the control board B.

Step 404: When the control board B has a fault, the control board A performs FV on the SW and the devices connected to the down ports of the SW from the control board B, and allocates the reserved resources to the SW and the devices connected to the down ports of the SW.

In an application scenario, when the control board B has a fault, the control board A may convert an up port of the SW connected to the control board B to an NT bridge, and convert an NT bridge of the SW connected to the control board A to an up port, thereby performing FV on the SW and the devices connected to the down ports of the SW from the control board B. At the same time, the control board A may perform the topology discovery on the SW and the devices connected to the down ports of the SW according to the depth traverse manner, allocate a part of or all bus resources reserved in advance to the up port and down ports of the SW, and allocate a part of or all bus resources and/or address space resources to the devices connected to the down ports of the SW according to a bus resource requirement of the SW and a bus resource requirement and/or an address space resource requirement of the devices, so that the SW and the devices connected to the down ports of the SW may continue normal operation under control of the control board A.

It can be seen that the SW and the devices connected to the down ports of the SW taken over by the control board A are allocated adequate operable resources, therefore being capable of operating normally under control of the control board A. Double control over the SW and the devices connected to the down ports of the SW is implemented successfully by the control board B and the control board A.

It can be understood that, if the topology discovery of the control board A proceeds to multiple NT bridges, and SWs where the multiple NT bridges are located are currently controlled by another one or more control boards, for an SW where each NT bridge is located and the devices connected to the down ports of the SW, the control board A may adopt the above manner to take over devices and allocate reserved resources, and details are not described herein again.

It can be understood that, in this embodiment, it is taken as an example for illustration that the control board A reserves resources in advance for the SW where the NT bridge is located and the devices connected to the down ports of the SW, and the SW is controlled by the control board B; when the control board B has a fault, the control board A takes over the SW and the devices connected to the down ports of the SW from the control board B, and allocates the reserved resources to the SW and the devices connected to the down ports of the SW. Definitely, the control board B may also reserve resources in advance for the SW where the NT bridge is located and the devices connected to the down ports of the SW, and the SW is controlled by the control board A; when the control board A has a fault, the control board B takes over the SW and the devices connected to the down ports of the SW from the control board A, and allocates the reserved resources to the SW and the devices. A process for the control board B to implement the device takeover may be the same as an implementation process of the control board A, and details are not described herein again.

For better understanding of the technical solution of this embodiment, the technical solution of this embodiment is further described in detail below through a specific example.

Figure 5A:
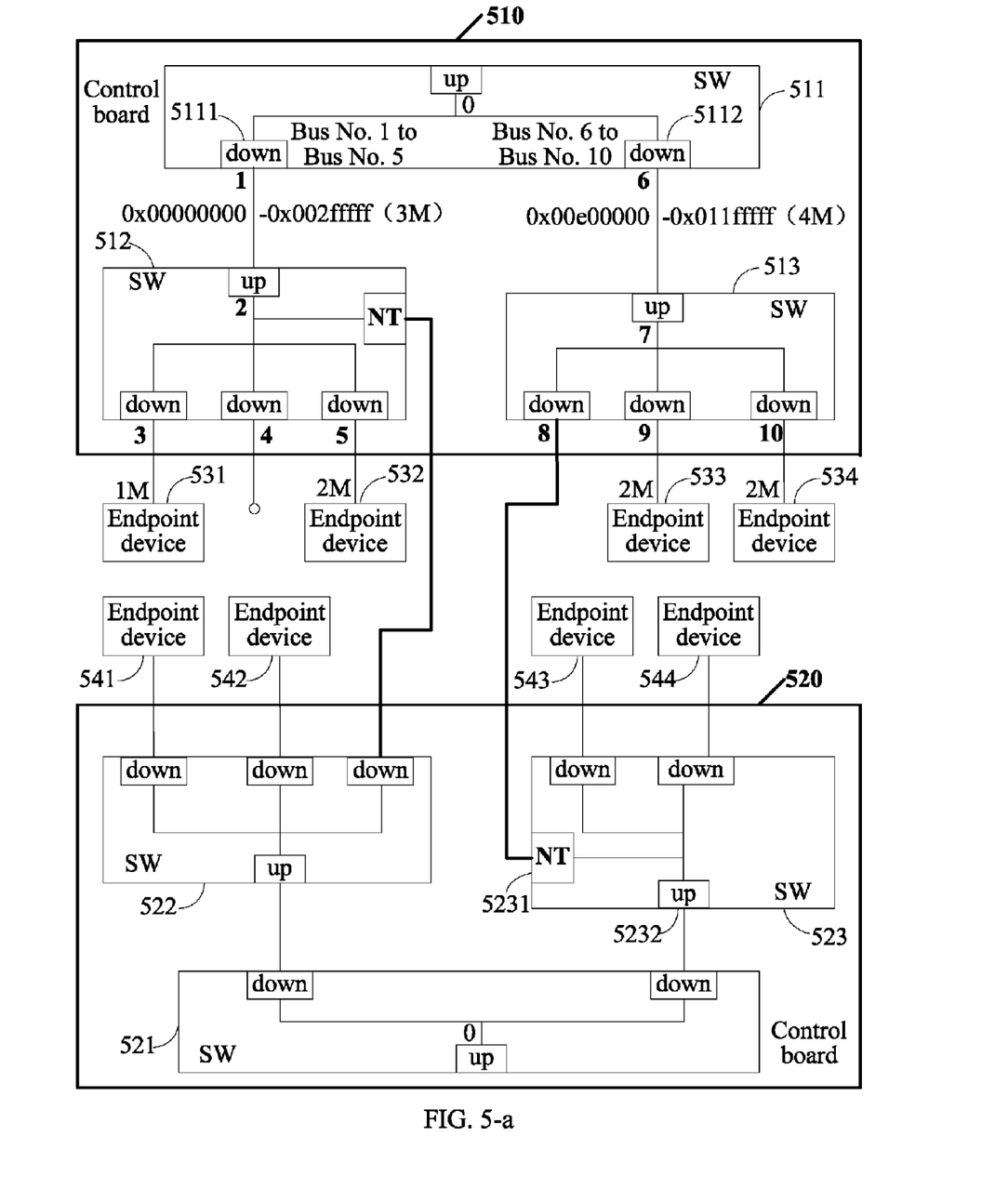
Figure 5B:
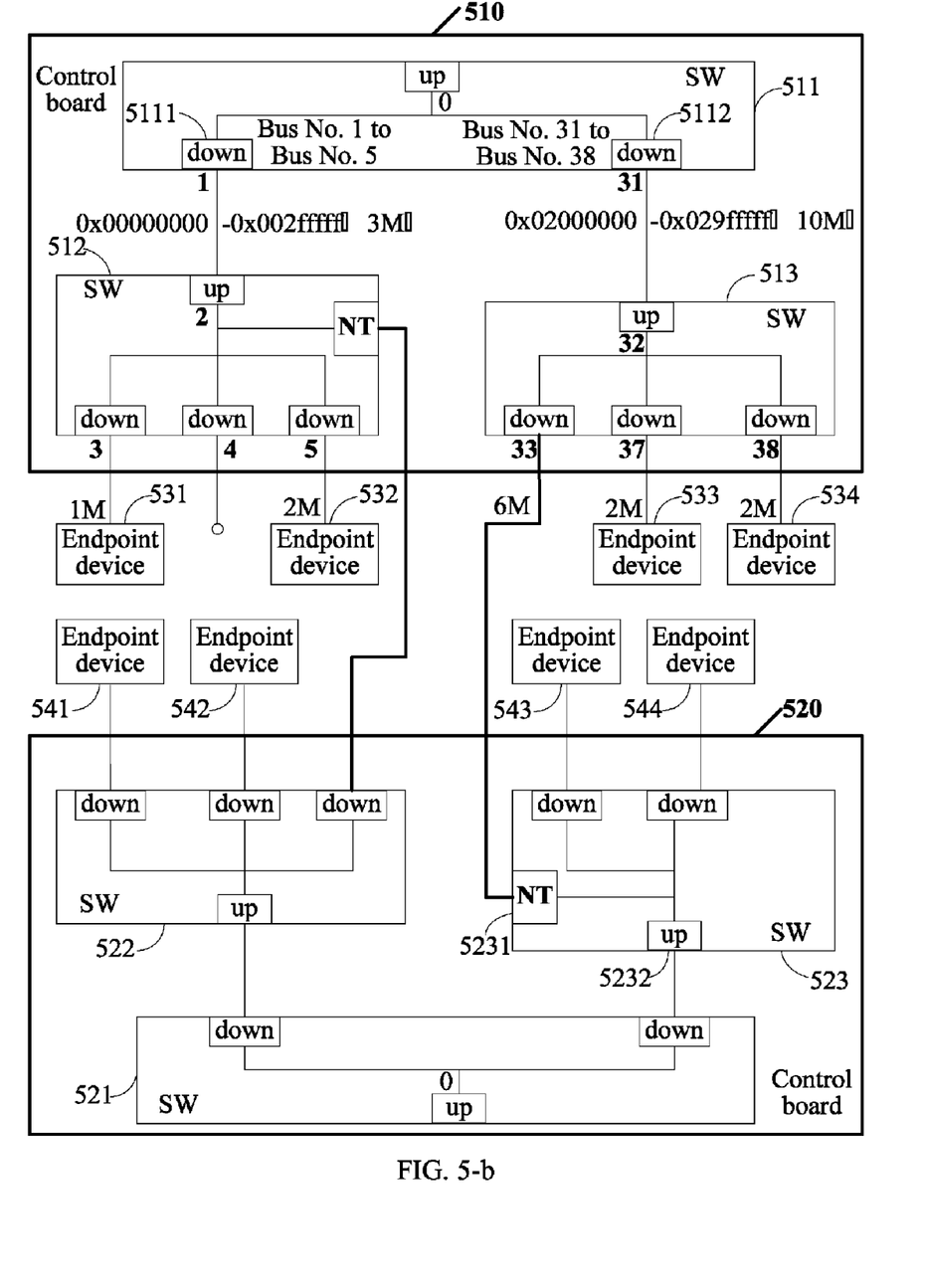
Figure 5C:
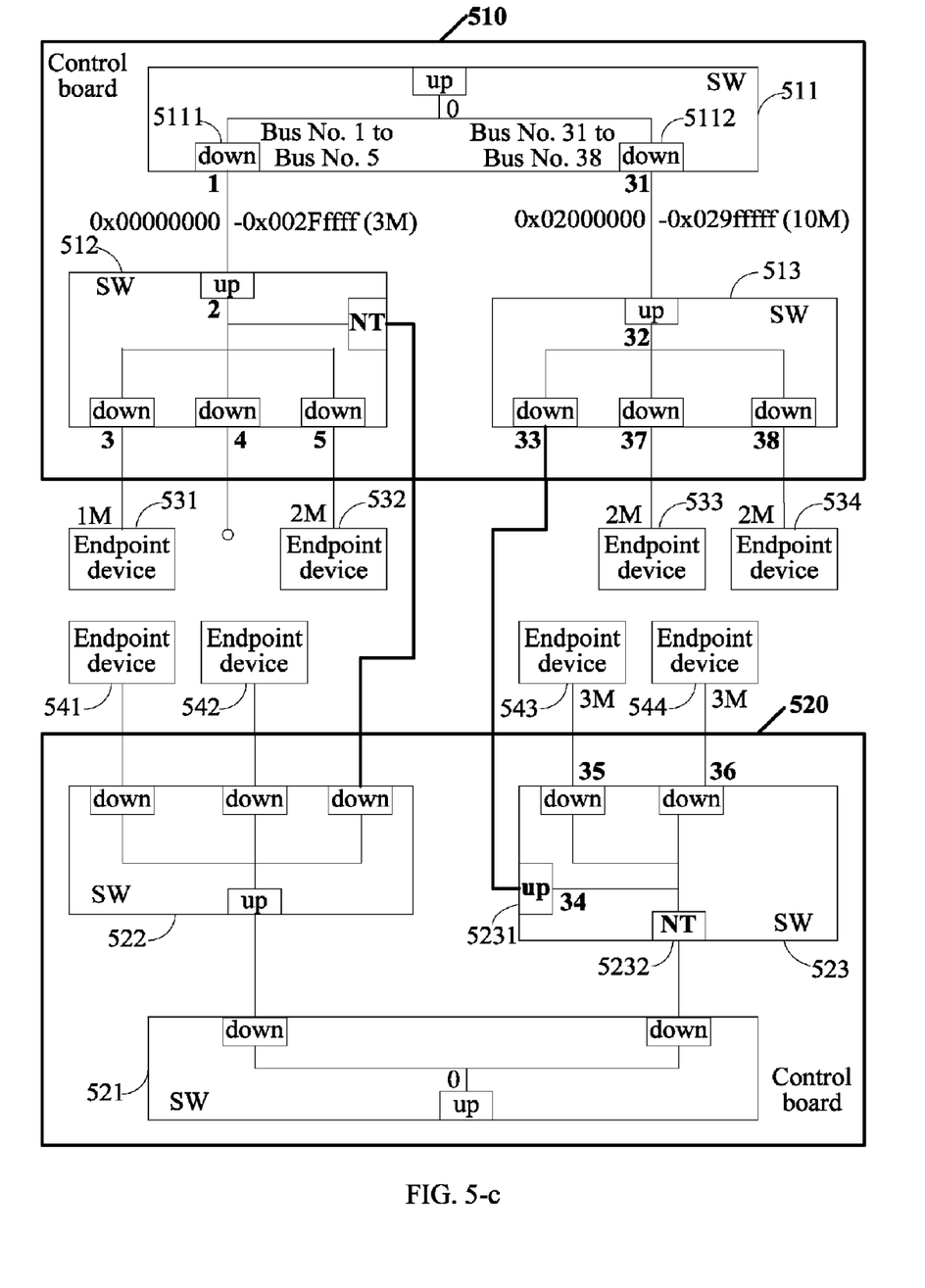

Referring to FIG. 5-a, FIG. 5-b and FIG. 5-c, it is taken as an example that a control board 510 is the above control board A, and a control board 520 is the above control board B. As shown in FIG. 5-a, FIG. 5-b and FIG. 5-c, the control board 510 controls an SW 511, an SW 512 and an SW 513. The control board 520 controls an SW 521, an SW 522 and an SW 523.

A down port 5111 of the SW 511 is connected to the SW 512; a down port 5112 is connected to the SW 513. An NT bridge port of the SW 512 is connected to a down port of the SW 522; a port 5231 of the SW 523 is connected to a down port of the SW 513.

When an OS of the control board 510 is started, a system kernel of the control board 510 may perform topology discovery on all tributaries under PCIE bus according to a depth traverse manner, and allocate address space resources and/or bus resources to endpoint devices and SWs without an NT bridge that the topology discovery proceeds to.

As shown in FIG. 5-a, the port 5231 of the SW 523 is an NT bridge currently, and a port 5232 is an up port currently. When the OS is started, the control board 510 allocates the No. 0 bus resource to an up port of the SW 511, allocates the No. 1 bus resource to the down port 5111, and allocates the No. 6 bus resource to the down port 5112; allocates No. 2, No. 3, No. 4 and No. 5 bus resources to the up port and down ports of the SW 512; allocates 1M (0x00000000~0x000fffff) address space resources to an endpoint device 531, and allocates 2M (0x00100000~0x002fffff) address space resources to an endpoint device 532; allocates No. 7, No. 8, No. 9 and No. 10 bus resources to the up port and down ports of the SW 513, allocates 2M (0x00e00000~0x00ffffff) address space resources to an endpoint device 533, and allocates 2M (0x01000000~0x011fffff) address space resources to an endpoint device 534; and temporarily does not allocate resources to the SW 523, and endpoint devices 543 and 544.

After the topology discovery is finished, a bus number range allowed by the port 5111 of the SW 511 is No. 1 to No. 5, and an address space range allowed by the port 5111 is 0x00000000~0x002fffff (3M); a bus number range allowed by the port 5112 is No. 6 to No. 10, and an address space range allowed by the port 5112 is 0x00e00000~0x011fffff (4M).

As shown in FIG. 5-b, at any moment after the OS operates stably, the control board 510 re-performs the topology discovery on a tributary where the NT bridge is located, namely re-performing the topology discovery downward from a top end (No. 0 bus) of the tributary where the NT bridge is located, reserves and re-allocates resources for devices connected to tributaries under the No. 0 bus.

For example, if the address space resource previously allocated is 0x01ffffff and the bus number previously allocated is No. 30, the control board 510 may re-allocate the No. 31 bus to the down port 5112 of the SW 511; re-allocate No. 32, No. 33, No. 37 and No. 38 bus resources to an up port and three down ports of the SW 513; reserve No. 34, No. 35 and No. 36 bus resources for the SW 523, and reserve 6M (0x02000000~0x025fffff) address space resources for the endpoint devices 543 and 544; re-allocate 2M (0x02600000~0x027fffff) address space resources to the endpoint device 533, and re-allocate 2M (0x02800000~0x029fffff) address space resources to the endpoint device 534.

After the re-performed topology discovery is finished, a bus number range allowed by the port 5111 of the SW 511 is No. 1 to No. 5, and an address space range allowed by the port 5111 is 0x00000000~0x002fffff (3M); a bus number range allowed by the port 5112 is No. 31 to No. 38, and an address space range allowed by the port 5112 is 0x02000000~0x029fffff (10M).

As shown in FIG. 5-c, when the control board 520 has a fault or due to other causes, the control board 510 takes over the SW 523, the endpoint device 543 and the endpoint device 544 from the control board 520, namely converting a port 5232 of the SW 523 to an NT bridge and converting a port 5231 of the SW 523 to an up port.

The control board 510 may perform the topology discovery on devices under the No. 33 bus according to the depth traverse manner, allocate the reserved No. 34, No. 35 and No. 36 bus resources to one up port and two down ports of the SW 523 and allocate the reserved 6M (0x02000000~0x025fffff) address space resources to the endpoint devices 543 and 544, for example, allocating 3M (0x02000000~0x022fffff) to the endpoint device 543 and allocating 3M (0x02300000~0x025fffff) to the endpoint device 544, according to resource requirements of the SW 523, the endpoint device 543 and the endpoint device 544.

At this time, as far as the control board 510 is concerned, the SW 523, the endpoint device 543 and the endpoint device 544 have relatively adequate operable resources. The control board 510 can control the SW 523, the endpoint device 543 and the endpoint device 544 to operate normally. The control board 510 and the control board 520 implement the double control over the SW 523, the endpoint device 543 and the endpoint device 544 by utilizing the NT bridge, thereby relatively improving an anti-fault capability of the system.

It can be understood that, the control board 520 may also perform the topology discovery on the PCIE bus according to the above manner, and reserve resources for the SW 512 where the NT bridge is located, and the endpoint device 531 and endpoint device 532 connected to the down ports of the SW of the control board 510. When the control board 510 has a fault, the control board 520 may also take over the SW 512, the endpoint device 531 and the endpoint device 532 according to the above manner, thereby implementing the double control by directly taking over the SW 512, the endpoint device 531 and the endpoint device 532.

It can be seen from the above technical solution that, in this embodiment, at any moment after the OS operates stably, the control board A reserves resources for the SW with the NT bridge and the devices connected to the down ports of the SW, wherein the SW is currently controlled by the control board B, and allocates the resources reserved in advance to the SW and the devices connected to the down ports of the SW after taking over the SW and the devices connected to the down ports of the SW from the control board B. In this way, the devices which are taken over have relatively adequate operable resources, and can operate normally under control of the control board A. The double control is implemented through direct taking over devices, and a response speed for processing a device request is improved relatively.

For convenience of better implementing the technical solution of the above embodiment of the present invention, an apparatus for taking over devices is further provided in an embodiment of the present invention.

Embodiment 4

Figure 6:
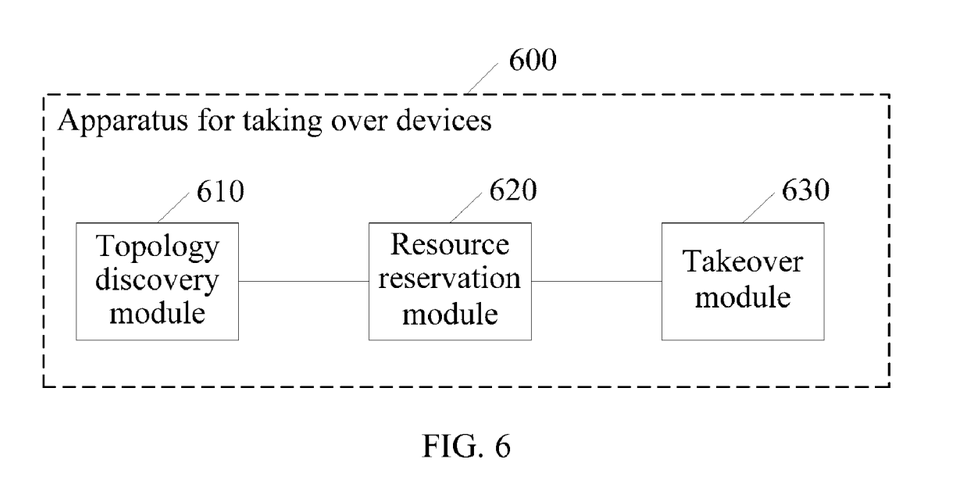
FIG. 6 is a schematic diagram of an apparatus for taking over devices according to Embodiment 4 of the present invention.

Referring to FIG. 6, an apparatus 600 for taking over devices according to Embodiment 4 of the present invention may include a topology discovery module 610, a resource reservation module 620 and a takeover module 630.

The topology discovery module 610 is configured to perform topology discovery on a PCIE bus.

The resource reservation module 620 is configured to reserve resources for an SW where an NT bridge is located and devices connected to down ports of the SW according to a set resource reservation policy when the topology discovery of the topology discovery module 610 proceeds to the NT bridge, where the SW where the NT bridge is located and the devices connected to the down ports of the SW are currently controlled by a second control board.

In a specific application, the above set resource reservation policy may include: the preset number of resources reserved for the SW where the NT bridge is located and the devices connected to the down ports of the SW in different scenarios. For example, if a down port of an SW with an NT bridge is usually connected to a network card device, the number of reserved address space resources may be set according to an address space resource requirement of the network card device, and adequate address space resources are reserved for the network card device as far as possible. The rest may be deduced by analogy.

The takeover module 630 is configured to take over the SW and the devices connected to the down ports of the SW from the second control board when the second control board has a fault, and allocate the resources reserved by the resource reservation module 620 to the SW and the devices, so that the SW and the devices operate under control of the apparatus 600 for taking over devices.

In an application scenario, the topology discovery module 610 may be specifically configured to perform the topology discovery on all tributaries of the PCIE bus when a system is started.

In an application scenario, the topology discovery module 610 may be specifically configured to perform the topology discovery on a tributary of the PCIE bus where the NT bridge is located during an operation process of the system.

In an application scenario, the resource reservation module 620 may be specifically configured to reserve bus resources for the SW where the NT bridge is located, wherein the SW is currently controlled by the second control board, and reserve bus resources and/or address space resources for the devices connected to the down ports of the SW according to the set resource reservation policy when the topology discovery of the topology discovery module 610 proceeds to the NT bridge.

In an application scenario, the takeover module 630 may include a takeover sub-module and a resource allocation sub-module.

The takeover sub-module is configured to take over the SW and the devices connected to the down ports of the SW from the second control board when the second control board has a fault.

The resource allocation sub-module is configured to allocate the bus resources that the resource reservation module 620 reserves for the SW to an up port and the down ports of the SW, and allocate the bus resources and/or address space resources that the resource reservation module 620 reserves for the devices connected to the down ports of the SW to the devices connected to the down ports of the SW.

In a specific application, when the second control board has a fault, the takeover sub-module may convert the NT bridge of the SW to an up port, thereby taking over the SW and the devices connected to the down ports of the SW, where the devices connected to the down ports of the SW may include endpoint devices and/or bridge devices.

The resource allocation sub-module may perform the topology discovery on the SW and the devices connected to the down ports of the SW according to a depth traverse manner, and allocate the resources reserved by the resource reservation module 620 to the SW and the devices connected to the down ports of the SW according to bus resources and/or address space resources required by the SW and the devices connected to the down ports of the SW.

For example, if the resource reservation module 620 reserves three bus resources and 6M address space resources in advance, the SW taken over by the takeover sub-module from the second control board currently includes one up port and two down ports, and the two down ports are connected to two endpoint devices respectively requiring 2M address space, then the resource allocation sub-module may respectively allocate the three bus resources reserved by the resource reservation module 620 in advance to the one up port and the two down ports of the SW, and uniformly or non-uniformly allocate the 6M address space resources reserved by the resource reservation module 620 in advance to the two endpoint devices connected to the down ports of the SW.

It can be understood that the apparatus 600 for taking over devices of this embodiment may be set in the control board A of Embodiment 2 or Embodiment 3 or in other devices, and functions of each functional module of the apparatus 600 may be specifically implemented according to the method in Embodiment 2 or Embodiment 3. For a specific implementation process of the functions, references may be made to related descriptions in the above embodiment, and details are not described herein again.

It can be seen from the above technical solution that, in this embodiment, the apparatus for taking over devices reserves resources in advance for the SW with the NT bridge and the devices connected to the down ports of the SW, where the SW is controlled by the second control board, and allocates the resources reserved in advance to the SW and the devices connected to the down ports of the SW after taking over the SW and the devices from the second control board. In this way, the devices that are taken over have relatively adequate operable resources, and can operate normally under control of the apparatus for taking over devices. Double control is implemented through direct taking over devices, and a response speed for processing a device request is improved relatively.

For convenience of better implementing the technical solution of the above embodiment of the present invention, a dual control system is further provided in an embodiment of the present invention.

Embodiment 5

Figure 7:
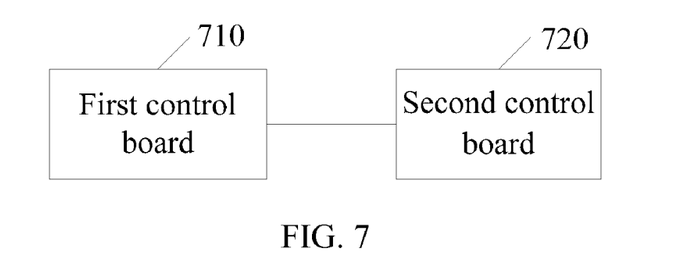
FIG. 7 is a schematic diagram of a dual control system according to Embodiment 5 of the present invention.

Referring to FIG. 7, a dual control system according to Embodiment 5 of the present invention may include a first control board 710 and a second control board 720.

The first control board 710 is configured to perform topology discovery on a PCIE bus; reserve resources for an SW where an NT bridge is located and devices connected to down ports of the SW according to a set resource reservation policy when the topology discovery proceeds to the NT bridge, where the SW where the NT bridge is located and the devices connected to the down ports of the SW are currently controlled by the second control board 720; and take over the SW and the devices connected to the down ports of the SW from the second control board 720 when the second control board 720 has a fault, and allocate the reserved resources to the SW and the devices connected to the down ports of the SW, so that the SW and the devices connected to the down ports of the SW operate under control of the first control board 710.

In addition, the second control board 720 may also be configured to perform topology discovery on a PCIE bus; reserve resources for an SW where an NT bridge is located and devices connected to down ports of the SW according to the set resource reservation policy when the topology discovery proceeds to the NT bridge, where the SW and the devices are currently controlled by the first control board 710; and take over the SW and the devices connected to the down ports of the SW from the first control board 710 when the first control board 710 has a fault, and allocate the reserved resources to the SW and the devices connected to the down ports of the SW, so that the SW and the devices operate under control of the second control board 720.

It can be understood that the first control board 710 of the dual control system in this embodiment may include the apparatus 600 for taking over devices in Embodiment 4. Functions of each entity of the dual control system may be specifically implemented according to the method in Embodiment 2 or Embodiment 3. For a specific implementation process of the functions, references may be made to related descriptions in the above embodiment, and details are not described herein again.

In the above embodiments, descriptions for the embodiments have different emphases. For a part not described in detail in some embodiment, references may be made to relevant descriptions in other embodiments.

It conclusion, in the embodiments of the present invention, a first control board reserves resources in advance for an SW with an NT bridge and devices connected to down ports of the SW, where the SW is controlled by a second control board, and allocates the resources reserved in advance to the SW and the devices connected to the down ports of the SW after taking over the SW and the devices from the second control board. In this way, the devices that are taken over have relatively adequate operable resources, and can operate normally under control of the first control board. Dual control is implemented through direct taking over devices, and a response speed for processing a device request is relatively improved.

Persons of ordinary skill in the art should understand that all or a part of the processes of the method according to the embodiments of the present invention may be implemented by a program instructing relevant hardware. The program may be stored in a computer readable storage medium. When the program is run, the processes of the method according to the embodiments of the present invention are performed. The storage medium may be a magnetic disk, an optical disk, a Read-Only Memory (ROM) or a Random Access Memory (RAM).

A method and system for taking over devices according to the embodiments of the present invention are introduced in detail above. Specific cases are used for illustrating principles and implementation manners of the present invention. The above descriptions of the embodiments are merely for understanding the method and core ideas of the present invention. Meanwhile, persons of ordinary skill in the art may make modifications to the specific implementation manners and application ranges according to the idea of the present invention. In conclusion, the content of the specification shall not be regarded as a limitation to the present invention.

What is claimed is:
1. A method comprising:
performing, by a first control board, a topology discovery on a Peripheral Component Interconnect Express (PCIE) bus;
reserving, by the first control board, resources for a Switch (SW) where a Non-Transparent (NT) bridge is located and a device connected to a down port of the SW according to a set resource reservation policy when the topology discovery proceeds to the Non-Transparent(NT) bridge, wherein the SW and the device are currently controlled by a second control board; and
taking over, by the first control board, the SW and the device from the second control board when the second control board has a fault, and allocating the reserved resources to the SW and the device.

2. The method according to claim 1, wherein the performing the topology discovery on the PCIE bus comprises:
when an Operating System (OS) of the first control board is started, performing the topology discovery on all tributaries of the PCIE bus; or
during an operation process of the OS of the first control board, performing the topology discovery on a tributary of the PCIE bus where the NT bridge is located.

3. The method according to claim 1, wherein the reserving resources for the SW where the NT bridge is located and the device connected to the down port of the SW according to the set resource reservation policy comprises:
reserving bus resources for the SW where the NT bridge is located, and reserving bus resources and/or address space resources for the device connected to the down port of the SW according to the set resource reservation policy, wherein the SW is currently controlled by the second control board.

4. The method according to claim 2, wherein the reserving resources for the SW where the NT bridge is located and the device connected to the down port of the SW according to the set resource reservation policy comprises:
reserving bus resources for the SW where the NT bridge is located, and reserving bus resources and/or address space resources for the device connected to the down port of the SW according to the set resource reservation policy, wherein the SW is currently controlled by the second control board.

5. The method according to claim 1, wherein the allocating the reserved resources to the SW and the device comprises:
allocating the bus resources reserved for the SW to an up port and the down port of the SW, and allocating the bus resources and/or address space resources reserved for the device to the device.

6. The method according to claim 2, wherein the allocating the reserved resources to the SW and the device comprises:
allocating the bus resources reserved for the SW to an up port and the down port of the SW, and allocating the bus resources and/or address space resources reserved for the device to the devices.

7. A control apparatus, comprising:
a topology discovery module, configured to perform a topology discovery on a Peripheral Component Interconnect Express (PCIE) bus;
a resource reservation module, configured to reserve resources for a Switch (SW) where a NON-Transparent (NT) bridge is located and a device connected to a down port of the SW according to a set resource reservation policy when the topology discovery proceeds to the NT bridge, wherein the SW and the device are currently controlled by another control apparatus; and
a takeover module, configured to take over the SW and the device connected to the down port of the SW from the another control apparatus when the another control apparatus has a fault, and allocate the resources reserved by the resource reservation module to the SW and the device.

8. The apparatus according to claim 7, wherein the topology discovery module is configured to perform the topology discovery on all tributaries of the PCIE bus when a system is started.

9. The apparatus according to claim 8, wherein
the resource reservation module is configured to reserve bus resources for the SW where the NT bridge is located, and reserve bus resources and/or address space resources for the device connected to the down port of the SW according to the set resource reservation policy when the topology discovery of the topology discovery module proceeds to the NT bridge,
wherein the device connected to the down port of the SW comprise at least one type of the following devices: an endpoint device and a bridge device.

10. The apparatus according to claim 7, wherein the topology discovery module is further configured to perform the topology discovery on a tributary of the PCIE bus where the NT bridge is located during an operation process of the system.

11. The apparatus according to claim 10, wherein
the resource reservation module is configured to reserve bus resources for the SW where the NT bridge is located, and reserve bus resources and/or address space resources for the device connected to the down port of the SW according to the set resource reservation policy when the topology discovery of the topology discovery module proceeds to the NT bridge,
wherein the device connected to the down port of the SW comprise at least one type of the following devices: an endpoint device and a bridge device.

12. The apparatus according to claim 7, wherein
the resource reservation module is configured to reserve bus resources for the SW where the NT bridge is located, and reserve bus resources and/or address space resources for the device connected to the down port of the SW according to the set resource reservation policy when the topology discovery of the topology discovery module proceeds to the NT bridge,
wherein the device connected to the down port of the SW comprise at least one type of the following devices: an endpoint device and a bridge device.

13. The apparatus according to claim 12, wherein the takeover module comprises:
a takeover sub-module, configured to take over the SW and the device connected to the down port of the SW from the another control apparatus when the another control apparatus has a fault; and
a resource allocation sub-module, configured to allocate the bus resources that the resource reservation module reserves for the SW to an up port and the down port of the SW, and allocate the bus resources and/or address space resources that the resource reservation module reserves for the device to the device.

14. A system for dual controlling, comprising a first control board and a second control board, wherein
the first control board is configured to:
perform a topology discovery on a Peripheral Component Interconnect Express (PCIE) bus;
reserve resources for a Switch (SW) where a NON-Transparent (NT) bridge is located and a device connected to a down port of the SW according to a set resource reservation policy when the topology discovery proceeds to the NT bridge, wherein the SW where the NT bridge is located and the device are currently controlled by the second control board; and
take over the SW and the device from the second control board when the second control board has a fault, and allocate the reserved resources to the SW and the device.

15. The system according to claim 14, wherein
the first control board is configured to reserve bus resources for the SW where the NT bridge is located, and reserve bus resources and/or address space resources for the device connected to the down port of the SW according to the set resource reservation policy, wherein the SW is currently controlled by the second control board.

* * * * *